United States Patent
Zirwas et al.

(10) Patent No.: US 11,031,990 B2
(45) Date of Patent: Jun. 8, 2021

(54) BEAMFORMING

(71) Applicant: NOKIA TECHNOLOGIES OY, Espoo (FI)

(72) Inventors: Wolfgang Zirwas, Munich (DE); Muhammad Bilal Amin, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/346,603

(22) PCT Filed: Dec. 5, 2016

(86) PCT No.: PCT/IB2016/057361
§ 371 (c)(1),
(2) Date: May 1, 2019

(87) PCT Pub. No.: WO2018/083522
PCT Pub. Date: May 11, 2018

(65) Prior Publication Data
US 2019/0288764 A1    Sep. 19, 2019

(30) Foreign Application Priority Data
Nov. 3, 2016    (WO) .................. PCT/IB2016/056631

(51) Int. Cl.
H04B 7/08       (2006.01)
H04L 27/26      (2006.01)
H04B 7/0408     (2017.01)

(52) U.S. Cl.
CPC .......... H04B 7/086 (2013.01); H04B 7/0408 (2013.01); H04B 7/0857 (2013.01); H04L 27/265 (2013.01)

(58) Field of Classification Search
CPC .... H04B 7/0857; H04B 7/086; H04B 7/0408; H04L 27/265
USPC .......................................................... 375/347
See application file for complete search history.

(56) References Cited

U.S. PATENT DOCUMENTS 6,426,973 B1     7/2002  Madhow et al.
9,520,914 B2 *  12/2016  Khan ....................... H04B 1/56
9,762,302 B1 *   9/2017  Shaked ............... H04B 7/0456
(Continued)

FOREIGN PATENT DOCUMENTS

GB     421340      12/1934
WO     98/53560 A1 11/1998

OTHER PUBLICATIONS

Muhammad Bilal Amin and Martin Haardt; "Advanced Channel Prediction Concepts for 5G Radio Systems", Proceedings of the Twelfth International Symposium on Wireless Communication Systems, (ISWCS 15) 2015, 5 pages.
(Continued)

Primary Examiner — Hirdepal Singh
(74) Attorney, Agent, or Firm — Squire Patton Boggs (US) LLP

(57) ABSTRACT

A technique comprising: receiving a set of digital signals representative of a set of analogue electrical signals generated by radio transmissions in one or more antenna elements; generating at least two beamformed signals from the same set of digital signals; multiplying together said beamformed signals; and performing demodulation at least partially on an output of multiplying said beamformed signals.

11 Claims, 11 Drawing Sheets

(56) References Cited

U.S. PATENT DOCUMENTS

| | | | |
|---|---|---|---|
| 2007/0167799 A1* | 7/2007 | Cai | A61B 8/06 600/458 |
| 2008/0032631 A1 | 2/2008 | Dehos et al. | |
| 2011/0105172 A1* | 5/2011 | Guo | H04W 52/42 455/522 |
| 2014/0247906 A1 | 9/2014 | Pang et al. | |
| 2014/0327576 A1* | 11/2014 | Kumar | H04B 7/086 342/367 |
| 2015/0051880 A1 | 2/2015 | Ilitzky et al. | |
| 2015/0148098 A1 | 5/2015 | Grau Besoli et al. | |
| 2015/0172807 A1* | 6/2015 | Olsson | G10K 11/175 381/74 |
| 2016/0036528 A1* | 2/2016 | Zhao | H04B 10/58 398/141 |
| 2016/0099776 A1* | 4/2016 | Nakashima | H04B 10/541 398/186 |
| 2016/0197660 A1* | 7/2016 | O'Keeffe | H01Q 1/246 370/329 |
| 2016/0240923 A1 | 8/2016 | Oh et al. | |
| 2016/0295554 A1 | 10/2016 | Ko et al. | |
| 2017/0279470 A1* | 9/2017 | Lee | H04B 1/04 |

OTHER PUBLICATIONS

International Search Report & Written Opinion dated Jul. 25, 2017 corresponding to International Patent Application No. PCT/IB2016/057361.

Giulia Matrone et al., "The Delay Multiply and Sum Beamforming Algorithm in Ultrasound B-Mode Medical Imaging" IEEE Transactions on Medical Imaging, vol. 34, No. 4, Apr. 1, 2015, pp. 940-949, IEEE Service Center, Pascataway, NJ, US, XP011577164.

Fernando D. Nunes et al., "16-DAPSK Innovations-based Sequence Detection for Satellite Communications with Imperfect Carrier Synchronization", VTC 2002—Fall, 2002 IEEE 56th Vehicular Technology Conference Proceedings, Vancouver, Canada, Sep. 24-28, 2002, IEEE Vehicular Technology Conference, New York, NY: IEEE, US, vol. 1, Sep. 24, 2002, pp. 361-365, XP010608578.

Abhishek Tiwari et al., "Co-Array Processing Assisted Bayesian Beamforming (CABB): A Nonlinear Beamforming Technique for Joint Aerial Layer Network (JALN) Backbone", MILCOM 2013, 2013 IEEE Military Communications Conference, IEEE, Nov. 18, 2013, pp. 388-395, XP032563431.

European Extended Search Report issued in corresponding European Patent Application No. 16920520.0-1220 dated Aug. 24, 2020.

* cited by examiner

BEAMFORMING

Beamforming is used at a radio receiver to suppress interfering channel components. Conventional linear beamforming techniques such as e.g. those using a minimum mean square error (MMSE) algorithm or a zero-facing detection algorithm, are bettered in terms of achieving signal-to-noise ratio (SINR) gains by non-linear beamforming techniques such as e.g. that described in "Advanced channel prediction concepts for 5G radio systems" authored by M. B. Amin, W. Zirwas and M. Haardt in Proceedings of the Twelfth International Symposium on Wireless Communication Systems (ISWCS 15), 2015, whose entire content is incorporated herein by reference.

The inventors for the present application have carried out research into providing improved non-linear (NR) beamforming techniques, with the aim of achieving super-directivity effects without excessively complex implementation.

The inventors for the present application have also found that the SINR gains achievable with non-linear beamforming can outweigh the noise power rise and constellation point distortions that are a side-effect of non-linear beamforming.

There is hereby provided a method, comprising: receiving a set of digital signals representative of a set of analogue electrical signals generated by radio transmissions in one or more antenna elements; generating at least two beamformed signals from the same set of digital signals; multiplying together said beamformed signals; and performing demodulation at least partially on an output of multiplying said beamformed signals.

According to one embodiment, generating said at least two beamformed signals comprises applying different pre-coding filters to said same set of digital signals.

According to one embodiment, at least one of said precoding filters comprises a rectangular precoding filter.

According to one embodiment, generating said at least two beamformed signals comprises applying the same precoding filter to said same set of digital signals.

According to one embodiment, the method further comprises multiplying the at least two beamformed signals in antenna space.

According to one embodiment, the method further comprises multiplying the at least two beamformed signals in beam space.

According to one embodiment, the method further comprises: performing zero-padding on each of the at least two beamformed signals to create respective antenna space signals of increased antenna number size; converting the outputs of zero-padding to respective beamspace signals; multiplying together the beamspace signals; and converting the output of said multiplying back into antenna space.

There is also hereby provided a method, comprising: receiving a set of digital signals representative of a set of analogue electrical signals generated by radio transmissions in one or more antenna elements; and performing demodulation at least partially on an output of applying a non-linear processing function on said digital signals; wherein said non-linear processing function is selected from a predetermined set of predetermined non-linear processing functions each causing a different level of noise rise and/or constellation distortion.

There is also hereby provided a method, comprising: controlling pre-distortion of radio transmissions for a communication device to pre-compensate for distortions resulting from non-linear processing at the communication device of digital signals representative of analogue electrical signals generated in one or more antenna elements of the communication device.

According to one embodiment, said controlling pre-distortion comprises applying a level of pre-distortion mapped to one of a predetermined set of non-linear processing functions selected for use at the communication device.

There is also hereby provided a method comprising: receiving a set of digital signals representative of a set of analogue electrical signals generated by radio transmissions in one or more antenna elements; performing linear beamforming and non-linear beamforming on the set of digital signals; mixing an output of said linear beamforming and an output of said non-linear beamforming according to a mixing ratio, to create a mixed signal; and performing demodulation on said mixed signal.

According to one embodiment, said set of electrical signals comprise at least two electric signals generated in the same antenna element at different times during movement of said antenna element.

According to one embodiment, the method further comprises recovering, from radio transmissions by a control entity, downlink control information about the mixing ratio for the mixing.

According to one embodiment, said downlink control information indicates one of a predetermined set of mixing ratios.

According to one embodiment, said mixing ratio is specific to processing of digital signals for electrical signals generated in said one or more antenna elements in a certain transmission time interval.

According to one embodiment, said mixing ratio is determined on the basis of one or more factors affecting a level of radio interference at said antenna elements.

According to one embodiment, said one or more factors comprise one or more of: one or more powers of one or more radio transmissions for one or more other receiving devices in the same time interval; and the number of one or more other transmitters within range of the receiving device and making radio transmissions in said time interval.

According to one embodiment, the method further comprises: performing pre-distortion on the set of digital signals prior to said non-linear beamforming, to at least partially pre-compensate for distortions introduced by said non-linear beamforming, and thereby facilitate successful demodulation of said mixed signal.

According to one embodiment, said linear beamforming introduces less noise than said non-linear beamforming; and said non-linear beamforming provides greater interference reduction than said linear beamforming.

According to one embodiment, said linear beamforming comprises multiplying each digital signal by a single respective complex weight; and said non-linear beamforming comprises, for each digital signal, multiplying the digital signal by two or more complex weights in parallel and multiplying the resulting two or more signals.

There is also hereby provided a method, comprising: controlling the generation and transmission of radio signals carrying data to be communicated to a receiving device; and controlling the radio transmission of control information about a mixing ratio for the receiving device to apply when mixing outputs of linear beamforming and non-linear beamforming on a set of digital signals representative of a set of respective analogue electrical signals generated in one or more antenna elements of the receiving device, to create a mixed signal which is then subject to demodulation.

According to one embodiment, said control information indicates one of a predetermined set of mixing ratios.

According to one embodiment, said mixing ratio control information is specific to a transmission time interval.

According to one embodiment, the generation of said radio signals comprises pre-distortion to at least partially pre-compensate for distortions caused by said non-linear beamforming at the receiving device, and thereby facilitate demodulation of said mixed signal for successful recovery of said data.

According to one embodiment, the method further comprises determining said mixing ratio based on one or more factors affecting a level of interference at the receiving device in said time interval.

According to one embodiment, said one or more factors comprise one or more of: one or more powers of one or more radio transmissions for one or more other receiving devices in the same time interval; and the number of one or more other transmitters within range of the receiving device and making radio transmissions in said time interval.

According to one embodiment, said linear beamforming introduces less noise than said non-linear beamforming; and said non-linear beamforming provides greater interference reduction than said linear beamforming.

According to one embodiment, said linear beamforming comprises multiplying each digital signal by a single respective complex weight; and said non-linear beamforming comprises, for each digital signal, multiplying the digital signal by two or more complex weights in parallel and multiplying the resulting two or more digital signals.

There is also hereby provided a method, comprising controlling pre-distortion of radio transmissions for a communication device according to a mixing ratio to be applied by the communication device when mixing outputs of linear beamforming and non-linear beamforming on a set of digital signals representative of a set of respective analogue electrical signals generated in one or more antenna elements of the receiving device, to create a mixed signal which is then subject to demodulation.

According to one embodiment, the method further comprises recovering information about said mixing ratio from radio transmissions made by said communication device.

There is also hereby provided an apparatus comprising: a processor and memory including computer program code, wherein the memory and computer program code are configured to, with the processor, cause the apparatus to: receive a set of digital signals representative of a set of analogue electrical signals generated by radio transmissions in one or more antenna elements; generating at least two beamformed signals from the same set of digital signals; multiply together said beamformed signals; and perform demodulation at least partially on an output of multiplying said beamformed signals.

According to one embodiment, generating said at least two beamformed signals comprises applying different pre-coding filters to said same set of digital signals.

According to one embodiment, at least one of said pre-coding filters comprises a rectangular precoding filter.

According to one embodiment, generating said at least two beamformed signals comprises applying the same pre-coding filter to said same set of digital signals.

According to one embodiment, the memory and computer program code are further configured to, with the processor, cause the apparatus to: multiply the at least two beamformed signals in antenna space.

According to one embodiment, the memory and computer program code are further configured to, with the processor, cause the apparatus to: multiply the at least two beamformed signals in beam space.

According to one embodiment, the memory and computer program code are further configured to, with the processor, cause the apparatus to: perform zero-padding on each of the at least two beamformed signals to create respective antenna space signals of increased antenna number size; convert the outputs of zero-padding to respective beamspace signals; multiply together the beamspace signals; and convert the output of said multiplying back into antenna space.

There is also hereby provided an apparatus comprising: a processor and memory including computer program code, wherein the memory and computer program code are configured to, with the processor, cause the apparatus to: receive a set of digital signals representative of a set of analogue electrical signals generated by radio transmissions in one or more antenna elements; and perform demodulation at least partially on an output of applying a non-linear processing function on said digital signals; wherein said non-linear processing function is selected from a predetermined set of predetermined non-linear processing functions each causing a different level of noise rise and/or constellation distortion.

There is also hereby provided an apparatus comprising: a processor and memory including computer program code, wherein the memory and computer program code are configured to, with the processor, cause the apparatus to: control pre-distortion of radio transmissions for a communication device to pre-compensate for distortions resulting from non-linear processing at the communication device of digital signals representative of analogue electrical signals generated in one or more antenna elements of the communication device.

According to one embodiment, said controlling pre-distortion comprises applying a level of pre-distortion mapped to one of a predetermined set of non-linear processing functions selected for use at the communication device.

There is also hereby provided an apparatus comprising: a processor and memory including computer program code, wherein the memory and computer program code are configured to, with the processor, cause the apparatus to: receive a set of digital signals representative of a set of analogue electrical signals generated by radio transmissions in one or more antenna elements; perform linear beamforming and non-linear beamforming on the set of digital signals; mix an output of said linear beamforming and an output of said non-linear beamforming according to a mixing ratio, to create a mixed signal; and perform demodulation on said mixed signal.

According to one embodiment, said set of electrical signals comprise at least two electric signals generated in the same antenna element at different times during movement of said antenna element.

According to one embodiment, the memory and computer program code are further configured to, with the processor, cause the apparatus to: recover, from radio transmissions by a control entity, downlink control information about the mixing ratio for the mixing.

According to one embodiment, said downlink control information indicates one of a predetermined set of mixing ratios.

According to one embodiment, said mixing ratio is specific to processing of digital signals for electrical signals generated in said one or more antenna elements in a certain transmission time interval.

According to one embodiment, said mixing ratio is determined on the basis of one or more factors affecting a level of radio interference at said antenna elements.

According to one embodiment, said one or more factors comprise one or more of: one or more powers of one or more radio transmissions for one or more other receiving devices in the same time interval; and the number of one or more other transmitters within range of the receiving device and making radio transmissions in said time interval.

According to one embodiment, the memory and computer program code are further configured to, with the processor, cause the apparatus to: perform pre-distortion on the set of digital signals prior to said non-linear beamforming, to at least partially pre-compensate for distortions introduced by said non-linear beamforming, and thereby facilitate successful demodulation of said mixed signal.

According to one embodiment, said linear beamforming introduces less noise than said non-linear beamforming; and said non-linear beamforming provides greater interference reduction than said linear beamforming.

According to one embodiment, said linear beamforming comprises multiplying each digital signal by a single respective complex weight; and said non-linear beamforming comprises, for each digital signal, multiplying the digital signal by two or more complex weights in parallel and multiplying the resulting two or more signals.

There is also hereby provided an apparatus comprising: a processor and memory including computer program code, wherein the memory and computer program code are configured to, with the processor, cause the apparatus to: control the generation and transmission of radio signals carrying data to be communicated to a receiving device; and control the radio transmission of control information about a mixing ratio for the receiving device to apply when mixing outputs of linear beamforming and non-linear beamforming on a set of digital signals representative of a set of respective analogue electrical signals generated in one or more antenna elements of the receiving device, to create a mixed signal which is then subject to demodulation.

According to one embodiment, said control information indicates one of a predetermined set of mixing ratios.

According to one embodiment, said mixing ratio control information is specific to a transmission time interval.

According to one embodiment, the generation of said radio signals comprises pre-distortion to at least partially pre-compensate for distortions caused by said non-linear beamforming at the receiving device, and thereby facilitate demodulation of said mixed signal for successful recovery of said data.

According to one embodiment, the memory and computer program code are further configured to, with the processor, cause the apparatus to: determine said mixing ratio based on one or more factors affecting a level of interference at the receiving device in said time interval.

According to one embodiment, said one or more factors comprise one or more of: one or more powers of one or more radio transmissions for one or more other receiving devices in the same time interval; and the number of one or more other transmitters within range of the receiving device and making radio transmissions in said time interval.

According to one embodiment: said linear beamforming introduces less noise than said non-linear beamforming; and said non-linear beamforming provides greater interference reduction than said linear beamforming.

According to one embodiment, said linear beamforming comprises multiplying each digital signal by a single respective complex weight; and said non-linear beamforming comprises, for each digital signal, multiplying the digital signal by two or more complex weights in parallel and multiplying the resulting two or more digital signals.

There is also hereby provided an apparatus comprising: a processor and memory including computer program code, wherein the memory and computer program code are configured to, with the processor, cause the apparatus to: control pre-distortion of radio transmissions for a communication device according to a mixing ratio to be applied by the communication device when mixing outputs of linear beamforming and non-linear beamforming on a set of digital signals representative of a set of respective analogue electrical signals generated in one or more antenna elements of the receiving device, to create a mixed signal which is then subject to demodulation.

According to one embodiment, the memory and computer program code are further configured to, with the processor, cause the apparatus to: recover information about said mixing ratio from radio transmissions made by said communication device.

There is also hereby provided an apparatus, comprising: means for receiving a set of digital signals representative of a set of analogue electrical signals generated by radio transmissions in one or more antenna elements; means for generating at least two beamformed signals from the same set of digital signals; means for multiplying together said beamformed signals; and means for performing demodulation at least partially on an output of multiplying said beamformed signals.

There is also hereby provided an apparatus, comprising: means for receiving a set of digital signals representative of a set of analogue electrical signals generated by radio transmissions in one or more antenna elements; and means for performing demodulation at least partially on an output of applying a non-linear processing function on said digital signals; wherein said non-linear processing function is selected from a predetermined set of predetermined non-linear processing functions each causing a different level of noise rise and/or constellation distortion.

There is also hereby provided an apparatus, comprising: means for controlling pre-distortion of radio transmissions for a communication device to pre-compensate for distortions resulting from non-linear processing at the communication device of digital signals representative of analogue electrical signals generated in one or more antenna elements of the communication device.

There is also hereby provided an apparatus, comprising: means for receiving a set of digital signals representative of a set of analogue electrical signals generated by radio transmissions in one or more antenna elements; means for performing linear beamforming and non-linear beamforming on the set of digital signals; means for mixing an output of said linear beamforming and an output of said non-linear beamforming according to a mixing ratio, to create a mixed signal; and means for performing demodulation on said mixed signal.

There is also hereby provided an apparatus, comprising: means for controlling the generation and transmission of radio signals carrying data to be communicated to a receiving device; and means for controlling the radio transmission of control information about a mixing ratio for the receiving device to apply when mixing outputs of linear beamforming and non-linear beamforming on a set of digital signals representative of a set of respective analogue electrical signals generated in one or more antenna elements of the receiving device, to create a mixed signal which is then subject to demodulation.

There is also hereby provided an apparatus, comprising: means for controlling pre-distortion of radio transmissions for a communication device according to a mixing ratio to be applied by the communication device when mixing outputs of linear beamforming and non-linear beamforming on a set of digital signals representative of a set of respective analogue electrical signals generated in one or more antenna elements of the receiving device, to create a mixed signal which is then subject to demodulation.

There is also hereby provided a computer program product comprising program code means which when loaded into a computer controls the computer to: receive a set of digital signals representative of a set of analogue electrical signals generated by radio transmissions in one or more antenna elements; generate at least two beamformed signals from the same set of digital signals; multiply together said beamformed signals; and perform demodulation at least partially on an output of multiplying said beamformed signals.

There is also hereby provided a computer program product comprising program code means which when loaded into a computer controls the computer to: receive a set of digital signals representative of a set of analogue electrical signals generated by radio transmissions in one or more antenna elements; and perform demodulation at least partially on an output of applying a non-linear processing function on said digital signals; wherein said non-linear processing function is selected from a predetermined set of predetermined non-linear processing functions each causing a different level of noise rise and/or constellation distortion.

There is also hereby provided a computer program product comprising program code means which when loaded into a computer controls the computer to: control pre-distortion of radio transmissions for a communication device to pre-compensate for distortions resulting from non-linear processing at the communication device of digital signals representative of analogue electrical signals generated in one or more antenna elements of the communication device.

There is also hereby provided a computer program product comprising program code means which when loaded into a computer controls the computer to: receive a set of digital signals representative of a set of analogue electrical signals generated by radio transmissions in one or more antenna elements; perform linear beamforming and non-linear beamforming on the set of digital signals; mix an output of said linear beamforming and an output of said non-linear beamforming according to a mixing ratio, to create a mixed signal; and perform demodulation on said mixed signal.

There is also hereby provided a computer program product comprising program code means which when loaded into a computer controls the computer to: control the generation and transmission of radio signals carrying data to be communicated to a receiving device; and control the radio transmission of control information about a mixing ratio for the receiving device to apply when mixing outputs of linear beamforming and non-linear beamforming on a set of digital signals representative of a set of respective analogue electrical signals generated in one or more antenna elements of the receiving device, to create a mixed signal which is then subject to demodulation.

There is also hereby provided a computer program product comprising program code means which when loaded into a computer controls the computer to: control pre-distortion of radio transmissions for a communication device according to a mixing ratio to be applied by the communication device when mixing outputs of linear beamforming and non-linear beamforming on a set of digital signals representative of a set of respective analogue electrical signals generated in one or more antenna elements of the receiving device, to create a mixed signal which is then subject to demodulation.

Examples of techniques according to embodiments of the invention are described hereunder in detail, by way of example only, with reference to the accompanying drawings, in which.

The embodiment described in detail below involves a technique of mixing the output of linear beamforming with the output of an example of a non-linear beamforming technique. The same mixing technique can be used with other examples of non-linear beamforming techniques, and the below-described example of a non-linear beamforming technique is also useful even without mixing with an output of linear beamforming.

Figure 1:
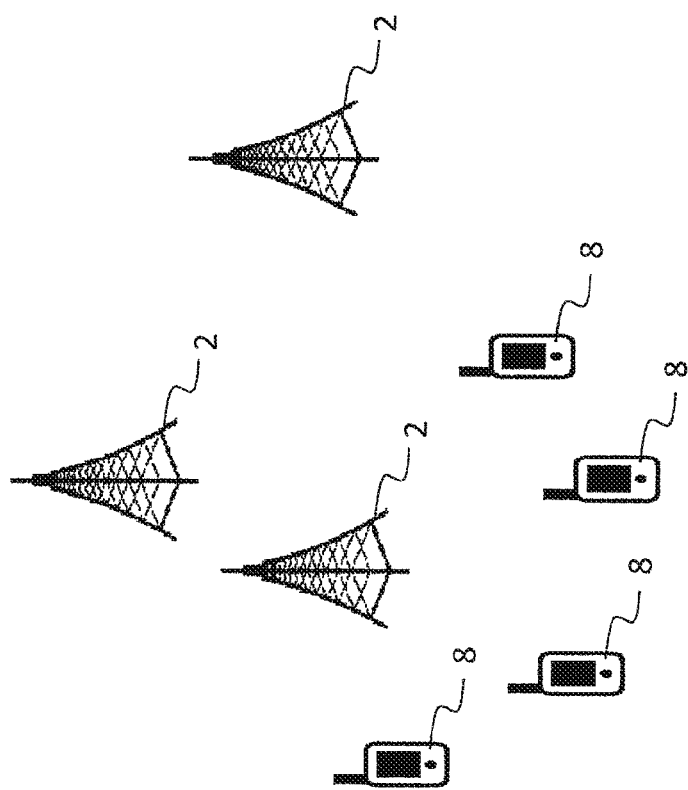
FIG. 1 illustrates one example of an environment in which embodiments of the present invention may be implemented.

FIG. 1 schematically shows an example of four user equipments (UEs) (for example, high complexity devices such as smartphones etc., low complexity devices such as MTC (machine-type communication) devices or any other type of wireless communication device) 8 located within the coverage area of a cell operated by a wireless network infrastructure node (wireless access point, eNB and the like) 2 belonging to a radio access network. FIG. 1 illustrates the example of eNBs as cell nodes; however, it should be understood that, instead of eNB, there can be any other type of wireless infrastructure nodes. Furthermore, FIG. 1 only shows a small number of eNBs, but a radio access network typically comprises a large number of eNBs each operating one or more cells.

Each eNB 2 of a radio access network is typically connected to one or more core network entities and/or a mobile management entity etc., but these other entities are omitted from FIG. 1 for conciseness.

Figure 2:
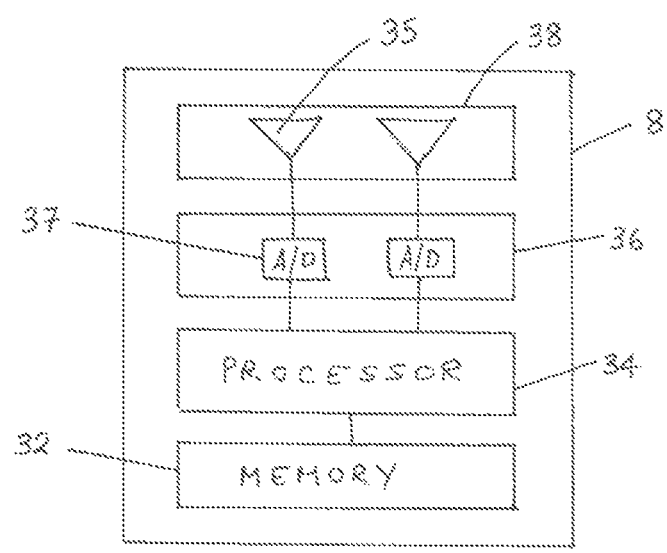
FIG. 2 illustrates one example of apparatus for use at the UEs of Figure1.

FIG. 2 shows a schematic view of an example of apparatus for each UE 8. The UE 8 may be used for various tasks such as making (initiating) and receiving phone calls, receiving and sending data from and to a data network, and experiencing, for example, multimedia or other content. The UE 8 may be any device at least capable of both recovering data/information from radio transmissions made by the eNB 2, and making radio transmissions from which data/information is recoverable by the eNB 2. Non-limiting examples of user equipment (UE) 8 include smartphones, tablets, personal computers, and devices without any user interface, such as devices that are designed for machine type communications (MTC).

With reference to FIG. 2, a baseband processor 34, operating in accordance with program code stored at memory 32, (i) receives digital signals from a RF front end 36 comprising circuitry including analogue-to-digital convertors 37 etc. for converting electric signals generated by radio transmissions in the antenna elements 35 to digital signals for the baseband processor 34, and (ii) processes the received digital signals as described in more detail below. The UE baseband processor 34 also controls the generation and transmission of radio signals via radio-frequency (RF) front end 36 and antenna array 38, again operating in accordance with program code stored at memory 32.

The UE 8 may also comprise an application processor (not shown) that generates user data for transmission via radio signals, and processes user data recovered from radio signals by baseband processor 34 and stored at memory 32. The application processor and the baseband processor 34 may be implemented as separate chips or combined into a single chip.

The memory 32 may be implemented as one or more chips. The memory 32 may include read-only memory, volatile memory, non-volatile memory and random-access memory. The above elements may be provided on one or more circuit boards.

Figure 6:
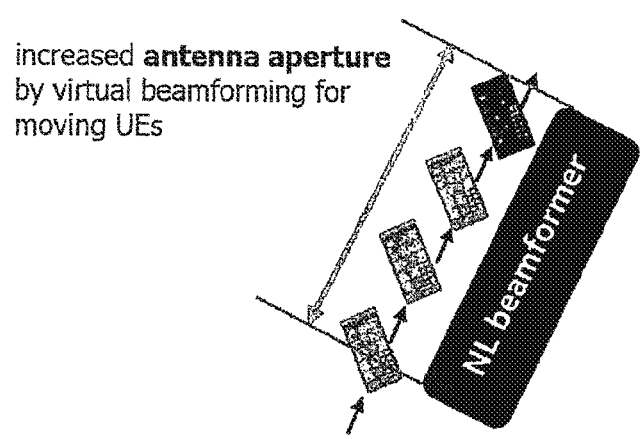
FIG. 6 illustrates an example of a technique for increasing antenna aperture by virtual beamforming for moving UEs.

FIG. 2 shows an example of a communication device 8 with two antenna elements 35 in the antenna array 38. A communication device 8 may have an antenna array 38 with more physical antenna array elements (providing a larger physical antenna aperture), but (as discussed below), an increased antenna aperture can also be achieved by exploiting the movement of the communication device 8 (and therefore the antenna array 38) to create an array of virtual antenna elements, as illustrated in FIG. 6. For example, two physical antenna elements may provide an eight antenna element virtual antenna array having a larger antenna aperture size than the physical antenna array, and virtual beamforming may be performed over this virtual antenna array.

The UE 8 may include additional other elements not shown in FIG. 2. For example, the UE 8 may include a user interface such as a key pad, voice command recognition device, touch sensitive screen or pad, combinations thereof or the like, via which a user may control operation of the UE 8. The UE may also include a display, a speaker and a microphone. Furthermore, the UE 8 may comprise appropriate connectors (either wired or wireless) for connecting to other devices and/or for connecting external accessories (e.g. hands-free equipment) thereto.

Figure 3:
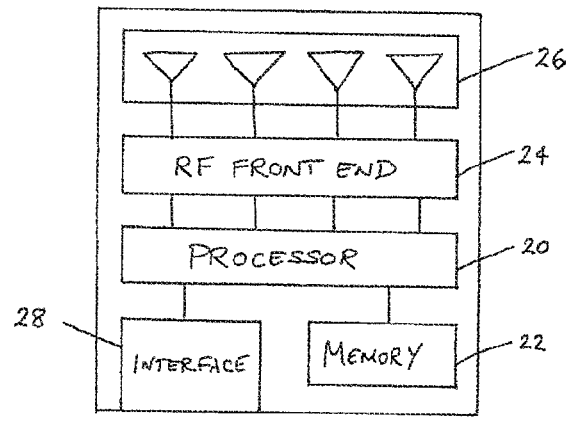
FIG. 3 illustrates one example of apparatus for use at the eNB of FIG. 1.

FIG. 3 shows an example of apparatus for use at the eNB 2 of FIG. 1. A baseband processor 20, operating in accordance with program code stored at memory 22, (a) controls the generation and transmission (or emission) of radio signals via the combination of RF front end 24 and antenna array 26; and (b) recovers data from radio signals reaching the eNB from e.g. UEs 8. Both the processor 20 and the memory 22 may be implemented as one or more chips. The memory 22 may include read-only memory, volatile memory, non-volatile memory and random-access memory. The above elements may be provided on one or more circuit boards. The apparatus also comprises an interface for transferring data to and from one or more other entities such as e.g. core network entities, mobile management entities, and other eNBs in the same access network.

It should be appreciated that the apparatus shown in each of FIGS. 2 and 3 described above may comprise further elements which are not directly involved with the embodiments of the invention described hereafter.

Figure 4:
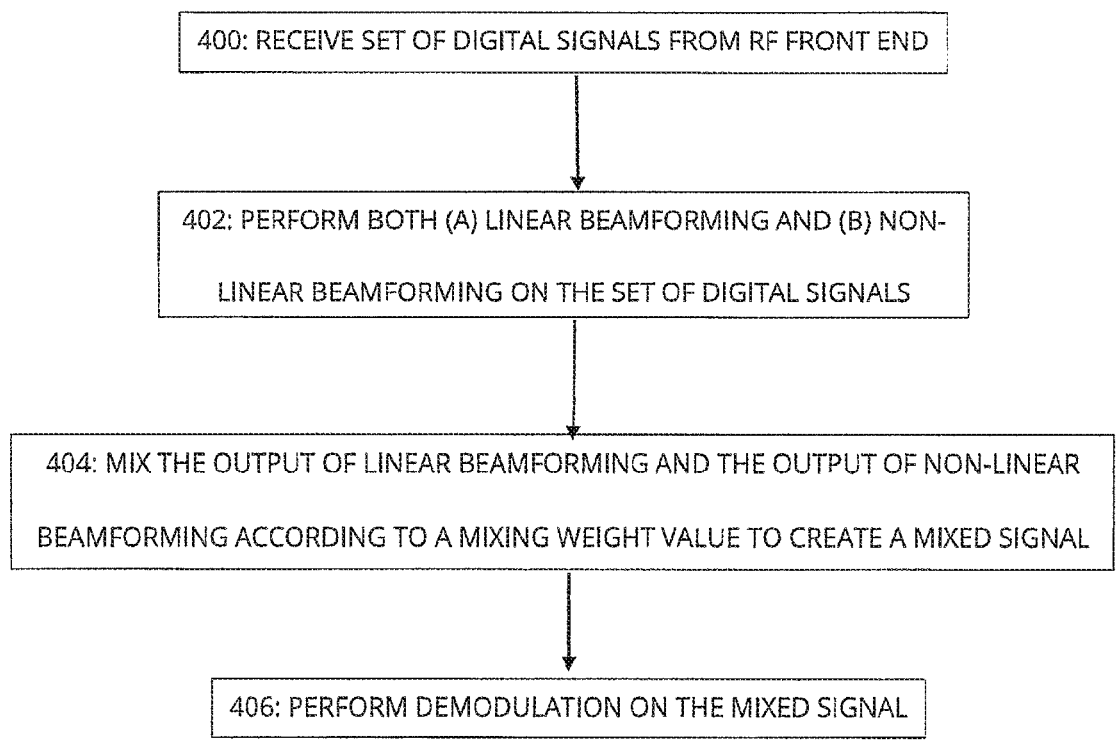
FIG. 4 illustrates one example of operations at the UE baseband processor in accordance with one embodiment of the present invention.

FIG. 4 illustrates one example of operations at UE baseband processor 34, according to an embodiment of the present invention.

The UE baseband processor 34 receives, from the RF front end 36, digital signals representative of electrical signals generated in the antenna elements 35 by radio transmissions, and stores the digital signals in memory (STEP 400).

The UE baseband processor 34 retrieves from memory a set of digital signals for the same time unit. Each digital signal of the set may originate from a respective physical antenna element of the antenna array, or one or more of this set of digital signals may originate from a virtual antenna element created by movement of the UE 8 (and the physical antenna elements), as illustrated in FIG. 6.

The UE baseband processor 34 performs both linear beamforming and non-linear beamforming on the set of digital signals (STEP 402); mixes the outputs of linear beamforming and non-linear beamforming according to a mixing weight a value to create a mixed signal (STEP 404); and then performs demodulation on the mixed signal (STEP 406).

Figure 7:
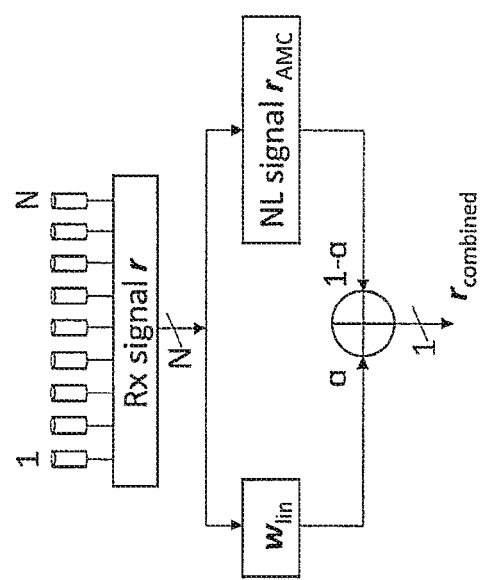
FIG. 7 illustrates adaptive mixing of a linear beamforming output with a non-linear beamforming output.

With reference to FIG. 7, the value of the mixing weight a indicates the extent to which the output of linear beamforming is to be mixed with the output of non-linear beamforming. For example, the mixing weight a could have a value ranging from 0 to 1, wherein: 0 indicates performing demodulation on the output of non-linear beamforming alone; 1 indicates performing demodulation on the output of linear beamforming alone; and values between 0 and 1 indicate performing demodulation on a mix of the outputs of linear beamforming and non-linear beamforming, with the mixing proportion indicated by the precise value of the mixing weight a value. For example, a mixing weight a value may be selected from a predetermined set of a limited number (e.g. 2 to 8) of values, which facilitates the reduction of signalling overhead in the case that mixing weight a value is communicated between the UE 8 and the eNB 2.

The mixing weight a value for the UE 8 may, for example, be determined by the UE processor 34 alone, according to e.g. MMSE criteria, or by the UE processor 34 and eNB processor 20 together, additionally taking into account other system level aspects. In one example, the optimum mixing weight a value is determined so as to achieve a predetermined balance between e.g. interference reduction and SNR losses. The eNB processor 20 may adapt the mixing weight a value per transmission time interval (TTI) in which data is transmitted to the UE 8, and the eNB baseband processor 20 may control the transmission of mixing weight a value information for a TTI together with scheduling information for the same TTI. The eNB baseband processor 20 may determine a mixing weight a value for a UE 8 based on one or more of: (i) the power of relevant channel components for all UEs in the same TTI, and (ii) scheduling decisions between cooperating sites for the TTI. In this connection, we note that radio transmissions in the same TTI by a potentially interfering transmitter (site) may not necessarily interfere with radio transmissions intended for the UE 8, depending on the physical radio resources (physical resource blocks (PRBs)) used for the radio transmissions by the potentially interfering transmitter.

In one embodiment, the mixing weight a value for a UE 8 is determined semi-statically on the basis of wideband pathloss measurements for all relevant channel components for the UE 8.

Figure 5A:
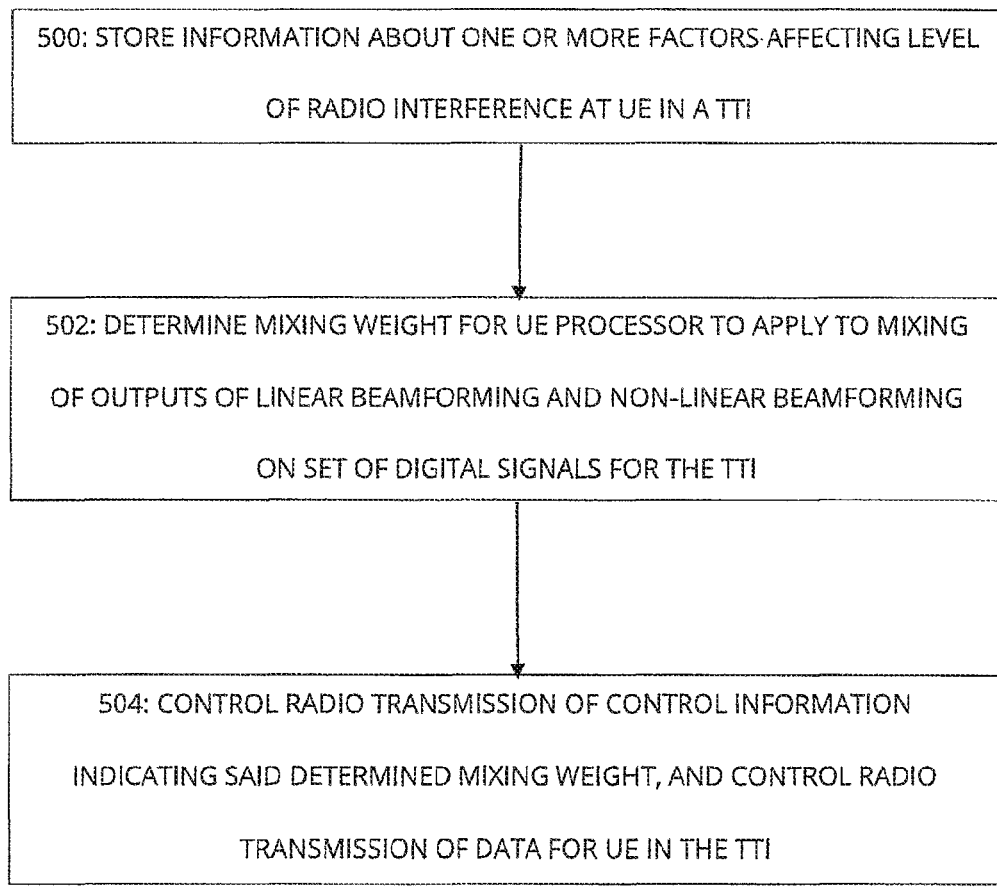
FIG. 5a illustrates one example of operations at the eNB baseband processor in accordance with one embodiment of the present invention.

FIG. 5a illustrates an example of operations at eNB processor 20 according to an embodiment of the invention, in which the eNB 2 participates in the determination of a mixing weight a value for the UE 8.

The eNB processor 20 stores in memory 22 information about one or more factors affecting a level of interference at UE 8 in a TTI in which there is scheduled a data transmission from eNB 2 to UE 8 (STEP 500). This information may, for example, include one or more of: information from the UE 2 about e.g. meeting of MMSE criterion; information about the power of radio transmissions by the same eNB 2 to other UEs 8 in the same TTI; and information (received e.g. via interface 28) about the number of other eNBs 2 in the range of UE 8 and making radio transmissions in the same TTI.

Based at least partly on this information, the eNB processor 20 determines a mixing weight for the UE baseband processor 34 to apply when mixing the outputs of linear beamforming and non-linear beamforming on digital signals representative of analogue signals generated in the UE antenna elements 25 in the TTI (STEP 502).

The eNB processor 20 then controls the radio transmission (via RF front end 24 and antenna array 26) of e.g. PDCCH control information indicating the mixing weight a value determined for use by the UE 8 in the TTI; and controls the generation and transmission in the TTI of radio signals carrying data for the UE 8 (STEP 504). For example, the mixing weight a value determined for use by the UE 8 in the TTI may be indicated in the PDCCH message indicating the scheduling of a transmission for the UE 8 in the TTI.

Figure 5B:
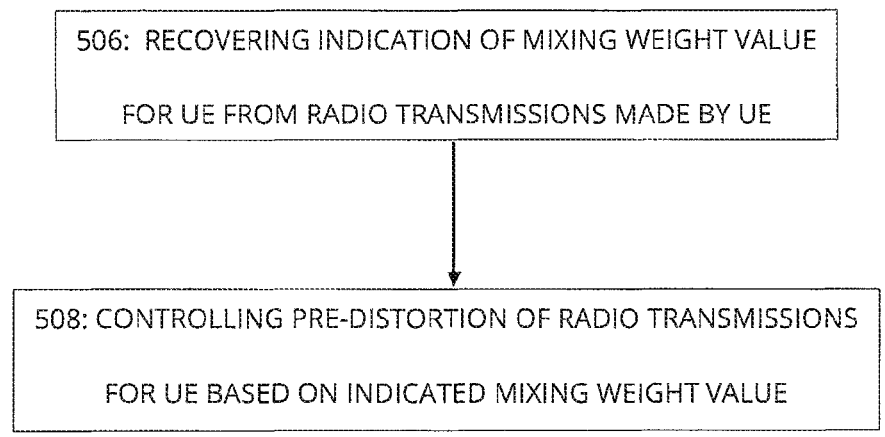
FIG. 5b illustrates another example of operations at the eNB baseband processor in accordance with one embodiment of the present invention.

FIG. 5b illustrates another example of operations at eNB processor 20 according to an embodiment of the invention, in which the eNB 2 does not participate in the determination of a mixing weight a value for the UE 8, but pre-distortion (to compensate for distortion introduced by linear beamforming at the UE 8) is performed at the eNB 2.

The eNB processor 20 recovers, from radio transmissions made by the UE 8, information indicating the mixing weight a value determined by the UE processor 34 (STEP 506). For example, the mixing weight a value determined by the UE processor 34 may be indicated in a physical uplink control channel (PUCCH) transmission by the UE 8.

The eNB processor 20 then controls a level of pre-distortion (inverse pre-coding) for radio transmissions for the UE 8 based on the indicated mixing weight a value (STEP 508). The value of the mixing weight a affects the constellation points of the signal on which demodulation is performed by the UE processor 34. If the indicated mixing weight a value is 1 (indicating demodulation based only on the output of linear beamforming at the UE processor 34), the eNB processor 34 directs the use of conventional LTE MCS (modulation and coding scheme) constellations. On the other hand, if the indicated mixing weight a value is less than 1 (indicating demodulation at the UE 8 based at least partly on the output of non-linear beamforming at the UE processor 34), the eNB processor 20 either (i) adopts a new MCS constellation designed to compensate for the degree to which a non-linear beamforming output is used for demodulation at the UE, or (ii) uses a conventional MCS constellation and applies an inverse operation to compensate for the degree to which a non-linear beamforming output is used for demodulation at the UE.

As mentioned below, according to one variation, conventional MCS constellations are used at the eNB 2 and no pre-distortion (inverse precoding) is done at the eNB 2. Any pre-distortion is performed by the UE processor 34 prior to non-linear beamforming. For example, the UE processor 34 might control this inverse operation (pre-distortion) using the demodulation reference signal (DMRS) received power as a reference point.

Figure 8:
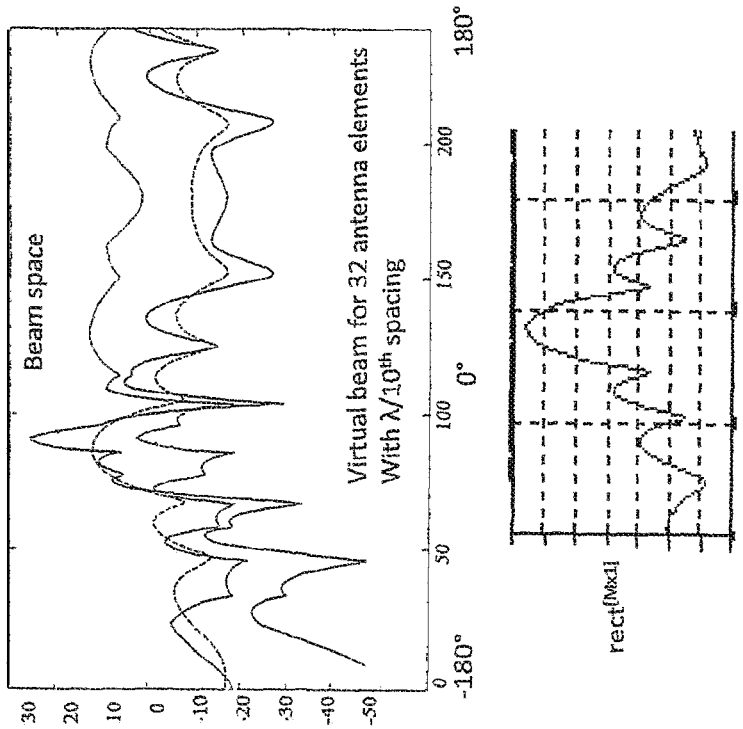
FIG. 8 illustrates one example of a non-linear beamforming technique.

FIG. 8 illustrates one example of a non-linear beamforming technique using non-linear artificial mutual coupling (AMC) processing. The UE processor 34 retrieves from memory the baseband Rx signal r—an antenna space signal comprising a set of N parallel Rx-signals of the N antenna elements of the (physical or virtual) antenna array. The UE processor 34 performs two precodings on the baseband Rx signal, using two unitary precoding filters $w_1$ and $w_{rect}$. The unitary filter values are chosen to differ only by a small relative phase offset. The UE processor 34 next performs zero padding. This zero padding extends the resulting antenna space signal to larger antenna space vectors by adding a number of zeros equal to M−N, wherein M is the size of the square DFT (discrete Fourier transform) matrix used in the next stage of processing. The UE processor 34 next converts the resulting extended antenna space vectors into beam space using M-point DFT matrices. In their beamspace form, the UE processor 34 multiples both signals by each other to form a super-directivity virtual beamspace signal exhibiting reduced half power beam width (HPBW) with strong sidelobe suppression. The UE processor 34 then converts this beamspace signal back into an antenna space signal using an inverse discrete Fourier transform (IDFT), and multiplies the antenna space signal by a matched filter or maximum ratio combiner (MRC). The UE processor 34 then sums up the N elements of the antenna space signal to generate the non-linear beamformed Rx signal $r_{AMC}$. As mentioned above, the UE processor then mixes this non-linear beamformed signal $r_A$MC with the output of linear beamforming on the same baseband Rx signal r, according to the mixing weight.

Figure 9:
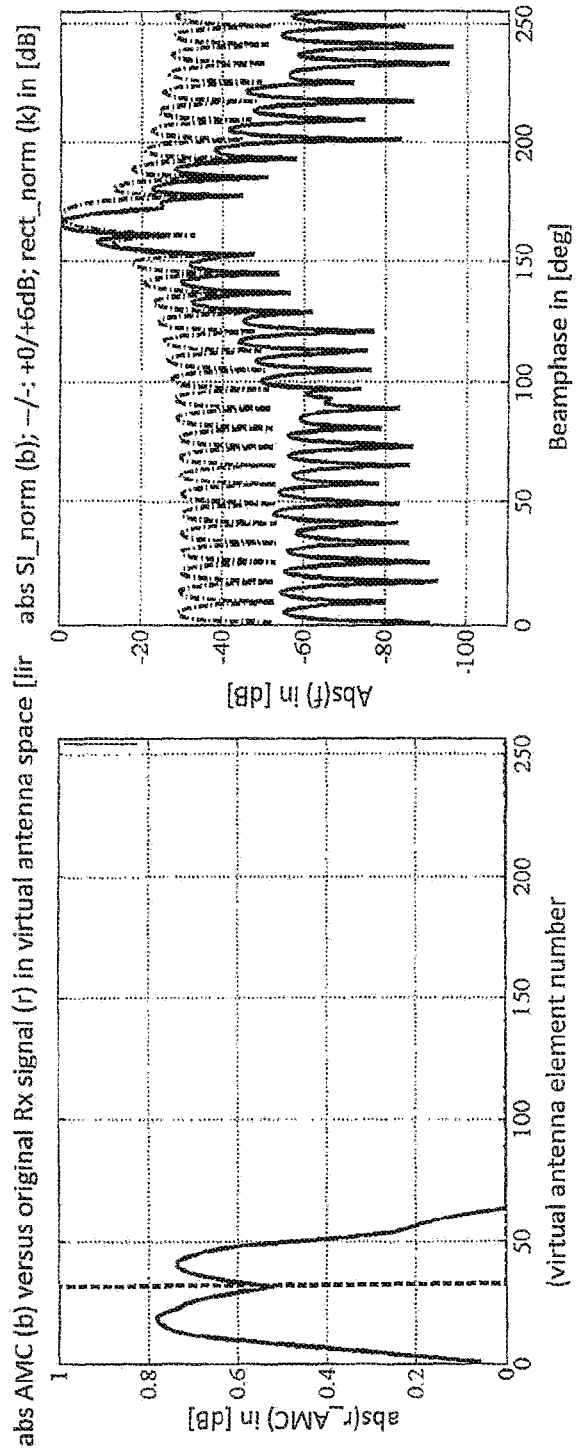
FIG. 9 illustrates an increase in directivity achievable with a non-linear beamforming technique.

Super directivity effects can also be achieved, with further simplification, using a rectangular space signal for the multiplication. FIG. 9 illustrates the SINR gains achievable by this non-linear beamforming technique involving generating a virtually increased antenna aperture by multiplication of the Rx signal by a rectangular space signal. The thick dashed line in the left-hand graph shows the Rx signal in antenna space over N=32 antenna elements after zero padding to 256 virtual antenna elements. The other (fainter and solid) line in the left-hand graph shows the Rx signal after non-linear multiplication with a rectangular filter in beam space, leading to an artificially increased antenna aperture of 64 antenna elements. The upper of the two lines in the right-hand graph indicates the signal intensity (SI) function of the rectangular filter in beamspace, and the lower of the two lines in the right-hand graph indicates the super-directivity beam pattern of the Rx signal after non-linear (NL) multiplication with the rectangular filter, which beam pattern has halved HPBW.

The AMC signal in antenna space (faint solid line in left-hand graph) has double the number of non-zero elements compared to the original Rx signal, which increase arises from the multiplication in beam space leading to a convolution in antenna space. The higher number of non-zero virtual antenna elements means an artificial doubling of the antenna aperture, allowing for an accordingly reduced HPBW, i.e. super directivity. The lower HPBW and the much lower side lobe power over all Rx angles allows for a very fine granular selection of Rx signals from very specific angles of arrival. Due to this selectivity, the number of relevant channel components seen as interfering signals at the UE 8 can be significantly reduced. Also, the number of relevant multipath components forming a certain channel component can be reduced significantly with accordingly improved channel predictability and reduced overhead for channel state information (CSI) reporting.

Figure 10:
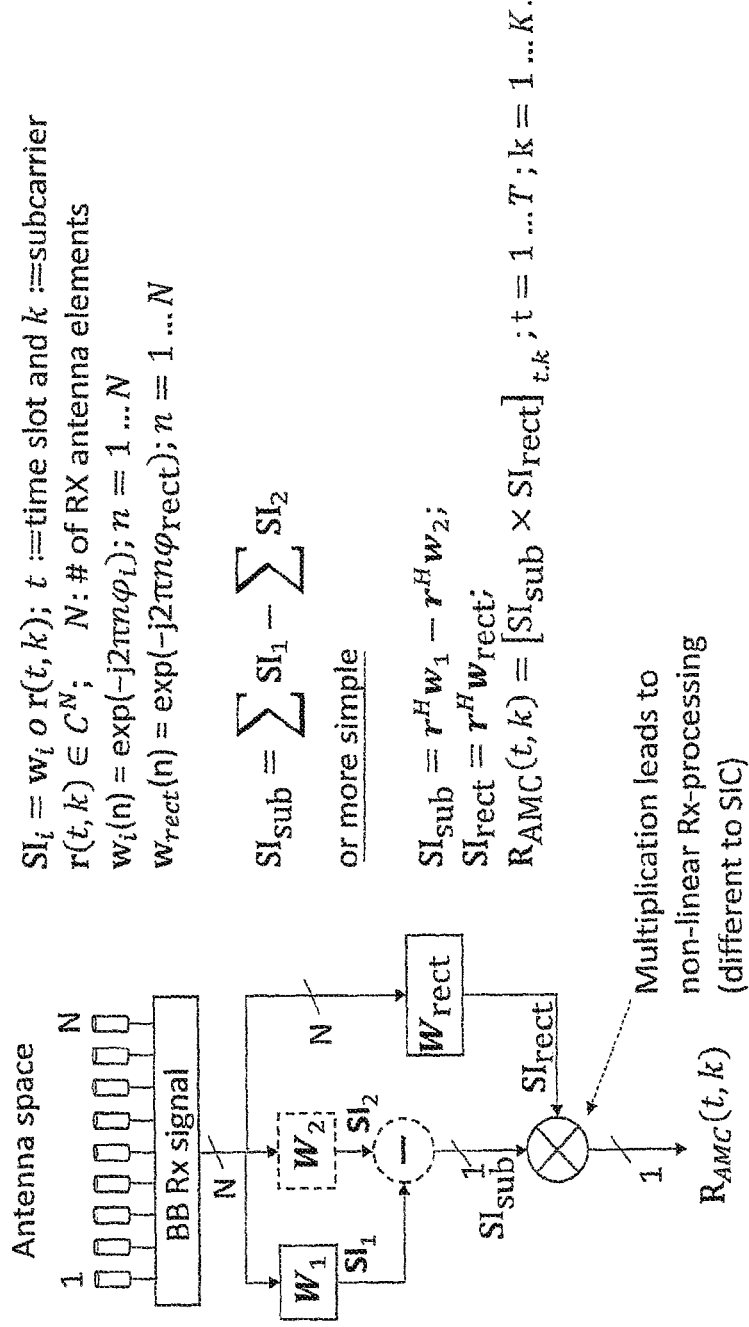
FIG. 10 illustrates another example of a non-linear beamforming technique.

A simpler implementation of the non-linear beamforming is illustrated in FIG. 10. This simpler implementation also involves the same unitary precoding by the UE processor 34 of the baseband Rx signal r (t,k) using precoding filters $w_1$ and $w_{rect}$, but the UE processor 34 then multiplies the resulting antenna space signals directly in antenna space to produce the non-linear beamformed Rx signal $R_{AMC}$. This multiplication is different to successive interference cancellation (SIC) which involves first decoding the stronger signal and afterwards subtracting the estimated signal from the weaker, interfering one.

Super directivity effects can also be achieved, with further simplification, by using the same precoding unitary filter for $w_1$ and $w_{rect}$, i.e. using the same precoding unitary filter to generate the two beamformed signals to be multiplied together.

The non-linear multiplication shown in FIG. 10 can be done either (i) in the frequency domain, or in the time domain. As a result of the generation of higher order spectral components known as polyspectra, the non-linear processing has the side-effect of increasing the number of terms (taps) of the output (e.g. the channel impulse response, where the input of the digital signal processing is a reference delta-function impulse signal); but (i) reducing the time variability of the baseband Rx signal (i.e. smoothening the time evolution (change over time) of the baseband Rx signal) at the linear beamforming stage, and (ii) performing the non-linear multiplication of the beam-formed signals in the time domain, is beneficial for minimizing this side-effect.

As mentioned above, one benefit of the non-linear processing described above, in relation to channel prediction, is that it can reduce the number of relevant multiple path components, thereby enabling reductions in the reporting overhead and greatly increasing the predictability. Another benefit is a reduction in the number of relevant channel components for massive MIMO grid of beam as well as co-ordinated multi-point (CoMP) transmission schemes, which reduction can help to reduce the interference floor per UE significantly.

Linear beamforming involves the UE processor 34 multiplying the N-element baseband Rx signal by complex weights to apply the phase shift and amplitude scaling required for each (physical or virtual) antenna element. Linear beamforming does not involve the UE processor 34 multiplying the resulting N-element signal with any other signal.

As mentioned above, varying the degree to which the output of non-linear beamforming is mixed with the output of linear beamforming makes it possible to limit SINR whilst still achieving sufficient suppression of inter-site interference, and makes it possible to minimise inverse precoding (pre-distortion) at the transmitter.

Figure 11:
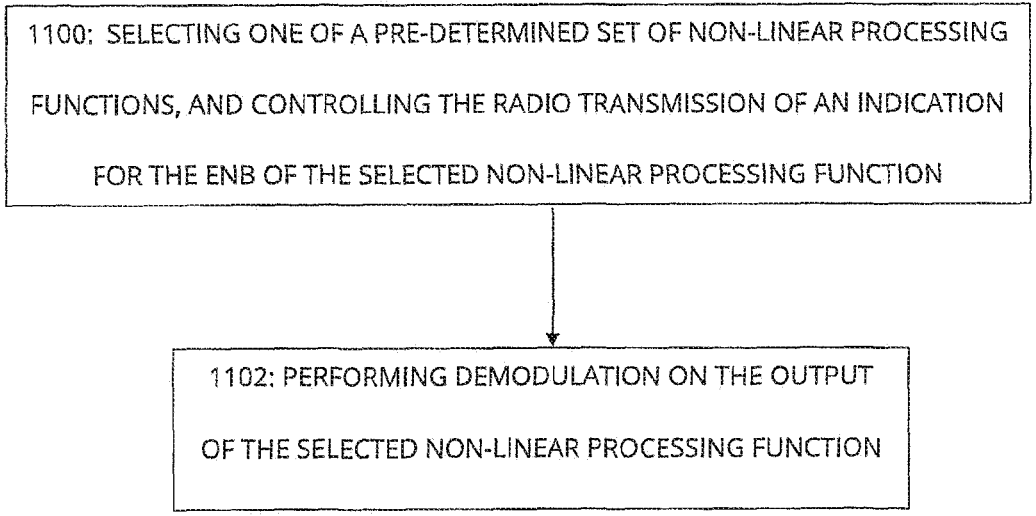
FIG. 11 illustrates another example of operations at a UE baseband processor according to an embodiment of the present invention.
Figure 12:
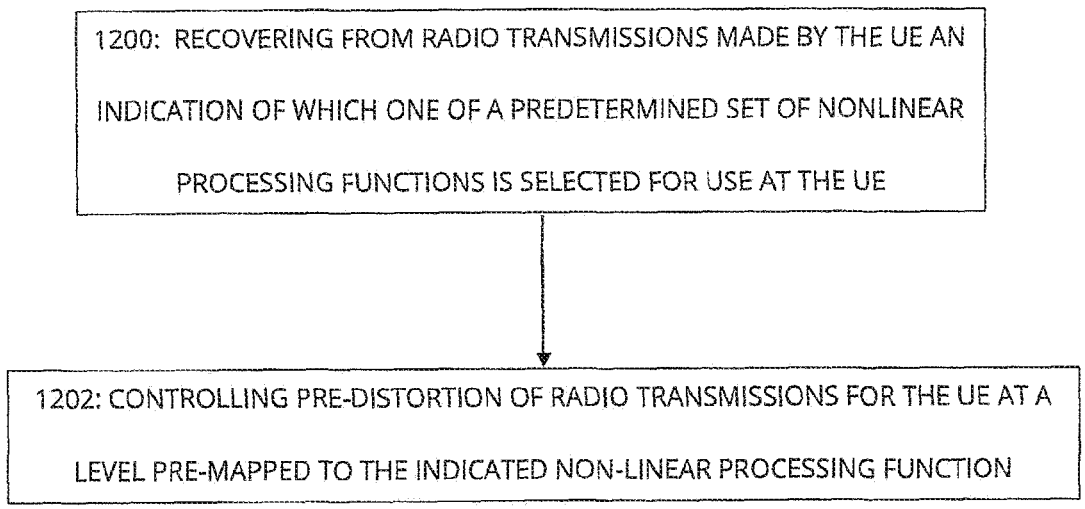
FIG. 12 illustrates another example of operations at a eNB baseband processor according to an embodiment of the present invention.

According to one variation illustrated in FIGS. 11 and 12: instead of mixing outputs of linear and non-linear processing, one of a predetermined set of non-linear processing functions each causing a different level of noise rise and a different degree of constellation distortion is selected for use at the UE 8. According to one example, this predetermined set of non-linear processing functions may comprise non-linear processing functions of the kind described above, but the predetermined set of non-linear processing functions may also comprise, for example, non-linear processing functions other than non-linear multiplications. The UE baseband processor 34 and eNB baseband processor 20 share information about which one of the predetermined set of non-linear processing functions is to be used in one or more TTIs. Either the UE baseband processor 34 selects the non-linear processing function to be used (STEP 1100), and the eNB baseband processor recovers an identification of the selected non-linear processing function from radio transmissions made by the UE 8 (STEP 1200); or vice versa. For those one or more TTIs, the eNB baseband processor 20 controls pre-distortion of radio transmissions for the UE 8 at a level mapped to the selected one of the predetermined set of non-linear processing functions (STEP 1202); and the UE baseband processor 34 performs demodulation on the output of the selected non-linear processing function (STEP 1102). This technique is another way of achieving sufficient SINR gains, without unnecessarily excessive noise rise or constellation distortion.

Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

The invention claimed is:
1. A method, comprising:
receiving a set of digital signals representative of a set of analogue electrical signals generated by radio transmissions in one or more antenna elements;
generating at least two beamformed signals from the same set of digital signals;
multiplying together said at least two beamformed signals; and
performing demodulation at least partially on an output of multiplying said at least two beamformed signals, wherein the generating said at least two beamformed signals comprises applying different precoding filters to said same set of digital signals.

2. A computer program product embodied on a non-transitory computer-readable medium, said computer program product comprising program code which, when loaded into a computer, controls the computer to perform a method according to claim 1.

3. A method, comprising:
receiving a set of digital signals representative of a set of analogue electrical signals generated by radio transmissions in one or more antenna elements; and
performing demodulation at least partially on an output of applying a non-linear processing function on said set of digital signals,
wherein said non-linear processing function is selected from a predetermined set of predetermined non-linear processing functions each causing a different level of noise rise or constellation distortion, for one or more transmission time intervals.

4. A method, comprising:
receiving a set of digital signals representative of a set of analogue electrical signals generated by radio transmissions in one or more antenna elements;
performing linear beamforming and non-linear beamforming on the set of digital signals;
mixing an output of said linear beamforming and an output of said non-linear beamforming according to a mixing ratio, to create a mixed signal; and
performing demodulation on said mixed signal,
wherein the linear beamforming comprises multiplying each digital signal by a single respective complex weight, and
wherein the non-linear beamforming comprises, for each digital signal, multiplying the digital signal by two or more complex weights in parallel and multiplying the resulting two or more signals.

5. An apparatus, comprising:
at least one processor; and
at least one memory including computer program code;
the at least one memory and the computer program code configured to, with the at least one processor, cause the apparatus to perform:
receiving a set of digital signals representative of a set of analogue electrical signals generated by radio transmissions in one or more antenna elements;
generating at least two beamformed signals from the same set of digital signals;
multiplying together said at least two beamformed signals; and
performing demodulation at least partially on an output of multiplying said at least two beamformed signals,
wherein the generating said at least two beamformed signals comprises applying different precoding filters to said same set of digital signals.

6. The apparatus according to claim 5, wherein at least one of said precoding filters comprises a rectangular precoding filter.

7. The apparatus according to claim 5, wherein the at least one memory and the computer program code are further configured to cause the apparatus to perform multiplying the at least two beamformed signals in antenna space.

8. The apparatus according to claim 5, wherein the at least one memory and the computer program code are further configured to cause the apparatus to perform multiplying the at least two beamformed signals in beam space.

9. The apparatus according to claim 8, wherein the at least one memory and the computer program code are further configured to cause the apparatus to perform:
performing zero-padding on each of the at least two beamformed signals to create respective antenna space signals of increased antenna number size;
converting the outputs of zero-padding to respective beamspace signals;
multiplying together the beamspace signals; and
converting the output of said multiplying back into antenna space.

10. An apparatus, comprising:
at least one processor; and
at least one memory including computer program code;
the at least one memory and the computer program code configured to, with the at least one processor, cause the apparatus to perform:
receiving a set of digital signals representative of a set of analogue electrical signals generated by radio transmissions in one or more antenna elements; and
performing demodulation at least partially on an output of applying a non-linear processing function on said set of digital signals;
wherein said non-linear processing function is selected from a predetermined set of predetermined non-linear processing functions each causing a different level of noise rise or constellation distortion, for one or more transmission time intervals.

11. An apparatus, comprising:
at least one processor; and
at least one memory including computer program code;
the at least one memory and the computer program code configured to, with the at least one processor, cause the apparatus to perform:
receiving a set of digital signals representative of a set of analogue electrical signals generated by radio transmissions in one or more antenna elements;
performing linear beamforming and non-linear beamforming on the set of digital signals;
mixing an output of said linear beamforming and an output of said non-linear beamforming according to a mixing ratio, to create a mixed signal; and
performing demodulation on said mixed signal,
wherein the linear beamforming comprises multiplying each digital signal by a single respective complex weight, and
wherein the non-linear beamforming comprises, for each digital signal, multiplying the digital signal by two or more complex weights in parallel and multiplying the resulting two or more signals.

* * * * *